(12) United States Patent
Peterson

(10) Patent No.: US 6,747,661 B1
(45) Date of Patent: Jun. 8, 2004

(54) GRAPHICS DATA COMPRESSION METHOD AND SYSTEM

(75) Inventor: James R. Peterson, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/507,776

(22) Filed: Feb. 18, 2000

(51) Int. Cl.[7] .............................. G09G 5/02; G09G 5/06
(52) U.S. Cl. .................. 345/589; 345/596; 345/597; 345/600; 345/604; 345/605; 345/555
(58) Field of Search ................. 345/589, 596, 345/597, 600, 604, 605, 555

(56) References Cited

U.S. PATENT DOCUMENTS

| | | | | | |
|---|---|---|---|---|---|
| 5,953,691 | A | * | 9/1999 | Mills ........................... | 702/198 |
| 5,995,080 | A | * | 11/1999 | Biro et al. .................. | 345/603 |
| 6,034,667 | A | * | 3/2000 | Barrett ....................... | 345/603 |
| 6,075,573 | A | * | 6/2000 | Shyu ........................... | 348/661 |
| 6,256,350 | B1 | * | 7/2001 | Bishay et al. .......... | 375/240.21 |
| 6,297,801 | B1 | * | 10/2001 | Jiang .......................... | 345/603 |
| 6,310,647 | B1 | * | 10/2001 | Parulski et al. ........ | 348/231.99 |
| 6,486,981 | B1 | * | 11/2002 | Shimura et al. ........... | 358/500 |
| 2002/0181794 | A1 | * | 12/2002 | Lee ............................. | 382/250 |

* cited by examiner

*Primary Examiner*—Jeffery Brier
*Assistant Examiner*—Javid Amini
(74) *Attorney, Agent, or Firm*—Dorsey & Whitney LLP

(57) ABSTRACT

Graphics data representing color values of pixels are compressed into a data structure. Each pixel has a color value that results from the combination of a luma component and chroma components. The number of bits representing the luma and chroma components of a pixel are reduced to less than eight bits, and the luma components of at least four pixels and at least two chroma components are combined into a data structure r bits in length. The number of bits of the data structure is derived from $r=2^s$, where s is an integer greater than or equal to five.

42 Claims, 3 Drawing Sheets

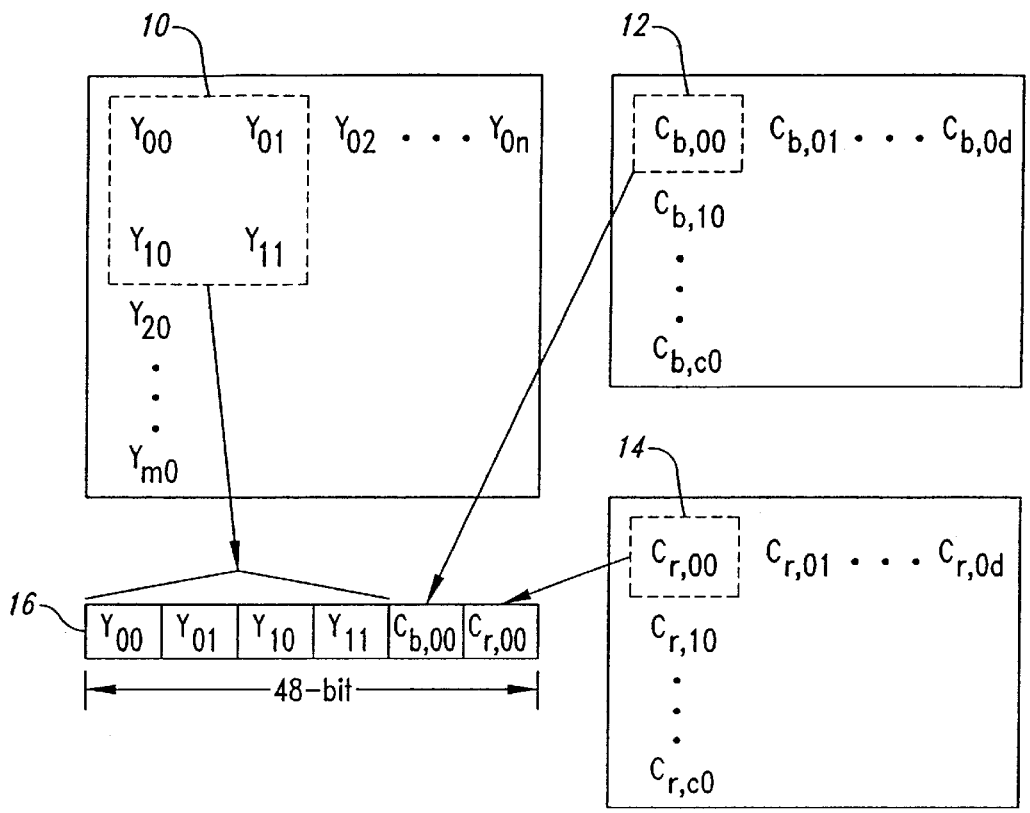
*Fig. 1*
*(Prior Art)*
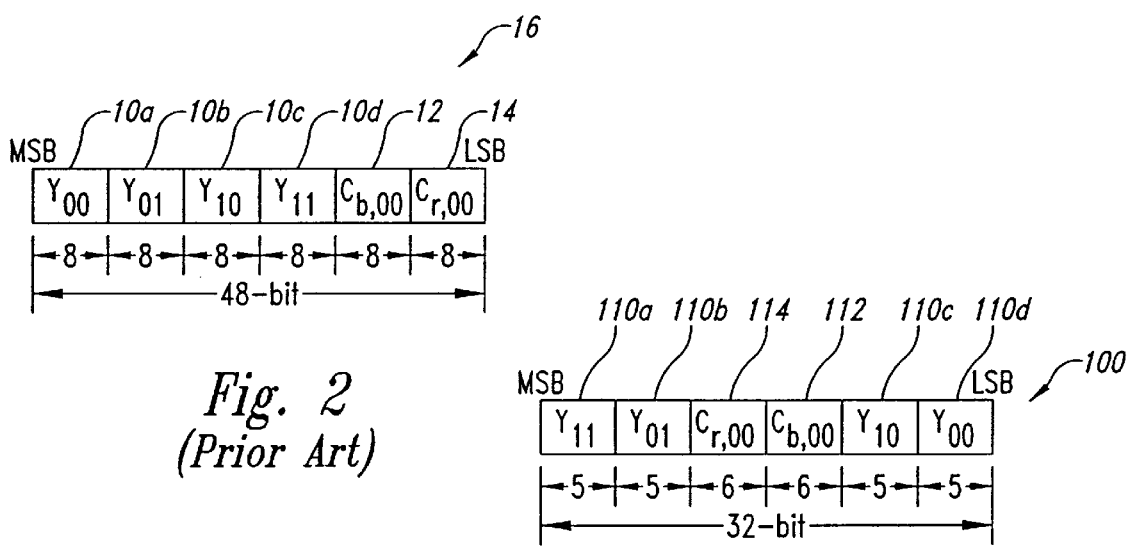
*Fig. 2*
*(Prior Art)*
*Fig. 5*

GRAPHICS DATA COMPRESSION METHOD AND SYSTEM

TECHNICAL FIELD

The present invention is related generally to the field of computer graphics, and more particularly, to compressing graphics data, such as texture data, in a computer graphics processing system.

BACKGROUND OF THE INVENTION

Computer graphics images displayed on a computer display are formed by a composite of individual colored pixels. The pixels are arranged in a large array having rows and columns, where each pixel in the array has a uniform color value. The pixels can be represented in various color spaces. It is often the case where color spaces can be separated into three separate components. The color of the pixel is determined by the combination of the three components of the color space in which the pixel's color is represented. Each of the components of the color space has a value represented by a binary value which indicates the relative intensity of the respective component. Typically, each component of a color space is represented by an 8-bit value so that there can be up to 256 different values for each of the components. As a result, it generally takes 24-bits to represent a pixel.

An example of a common color space in which the color of a pixel is represented is a red-green-blue (RGB) color space. Each pixel has red, green, and blue components, which, when combined, produce a color. The RGB color space is commonly used for pixels about to be displayed on a computer display. Another color space commonly used to represent the color of a pixel is the YUV color space. The YUV color space consists of three components, one luma component (Y), and two chroma components (UV). The luma value represents the black-and-white information of the pixel color, while the chroma components represent color information for the pixels. A specific version of the YUV color space is the YCbCr color space. The two chroma components are a blue chroma component (Cb) and a red chroma component (Cr).

Graphics processing system performance can be directly affected by the length of the pixel data. Generally, the more bits it takes to represent each pixel, the less efficient the graphics processing system becomes. For example, more memory is required to store longer pixel data, it takes more time to move longer pixel data from memory to a processor and back again, and color calculations based on pixel data are more complicated and time consuming. As the demand for faster graphics systems has increased, Methods for reducing the number of bits used to represent a pixel have been developed.

Present graphics processing systems use methods of data compression to reduce the number of bits required to represent a pixel. Some of these methods store pixel data in the YCbCr color space, and share the components of one pixel with another, or several other, adjacent pixels so that on the average, less information is stored for each pixel. The human eye is more sensitive to changes in the luma (Y) component than to changes in the chroma (CbCr) components. As a result, the Cb and Cr components are typically shared by multiple pixels, where each pixel has its own Y components. Although each component is represented by 8-bits, the compression of the pixel data occurs because the 16-bits representing the Cb and Cr components are shared by multiple pixels. Thus, where two pixels share the Cb and Cr components of one pixel, each pixel is represented by only 16-bits, on the average. That is,

[(16 bits, two Y components)+(8 bits, Cb component)+(8 bits, Cr component)]÷2 pixels=16-bits per pixel.

This format, commonly referred to as a 4:2:2 YCbCr format, results in a 3:2 compression over the 24-bits per pixel mentioned previously.

Greater data compression may be achieved by sharing the Cb and Cr components among more pixels, each of which have their own Y component. For example, where four pixels share the chroma components of one pixel, each pixel is represented, on the average, by only 12-bits, thus yielding a 2:1 compression ratio. That is, 48-bits are required to represent four pixels. This format is commonly referred to as a 4:1:1 YCbCr format.

A compression method similar to the 4:1:1 YCbCr format is illustrated in FIG. 1. Four pixels arranged in a two-by-two matrix 10 share two common Cb and Cr components, 12 and 14, respectively. Each of the four pixels in the matrix 10 has a luma component, represented in FIG. 1 by $Y_{00}$, $Y_{01}$, $Y_{10}$, and $Y_{11}$, respectively. The luma components $Y_{00}$, $Y_{01}$, $Y_{10}$, and $Y_{11}$ are combined with a corresponding blue chroma component 12, $Cb_{00}$, and a corresponding red chroma component 14, $Cr_{00}$, into a 48-bit data structure 16. This compression method is commonly referred to as a 4:2:0 YCbCr format, and has a resulting compression ratio of 2:1. As illustrated in FIG. 2, each of the Y components 10a–d, and each chroma component, 12 and 14, are represented by 8-bits, thus yielding a 48-bit data structure 16 for the four pixels of the matrix 10.

Although the 4:1:1 and 4:2:0 YCbCr formats provide a 2:1 compression ratio, the 48-bit length does not facilitate efficient memory address generation. That is, where the graphics data is tiled in memory, the address sequence for the graphics data, 0, 48, 96, . . . 48n, is not one that can be easily formulated using a binary base. Consequently, valuable processing resources that may be used to enhance graphics performance are wasted on generating memory addresses. Therefore, there is a need for an apparatus and compression technique that compresses graphics data into a data structure that, among other things, facilitates memory address generations

SUMMARY OF THE INVENTION

An apparatus and method for compressing graphics data representing color values of pixels. Each pixel has a color value that results from the combination of a luma component and chroma components. The number of bits representing the luma and chroma components of a pixel are reduced to less than eight bits, and the luma components of at least four pixels and at least two chroma components are combined into a data structure r bits in length. The number of bits of the data structure is derived from $r=2^s$, where s is an integer greater than or equal to five.

In an aspect of the invention, s=5, resulting in a data structure 32-bits in length. In another aspect of the invention, the data structure consists of the luma components for four pixels and two chroma components. The components may be arranged such that the chroma components are preceded, and followed by the luma components of two pixels. In another aspect of the invention, the luma components are 5-bits in length, and the chroma components are 6-bits in length.

BRIEF DESCRIPTION OF THE DRAWINGS

FIG. 1 is a diagram of graphics data represented in a conventional 4:2:0 YCbCr format.

FIG. 2 is a diagram of a data structure for the graphics data of FIG. 1.

FIG. 5 is a diagram of graphics data according to an embodiment of the present invention.

DETAILED DESCRIPTION OF THE INVENTION

Figure 3:
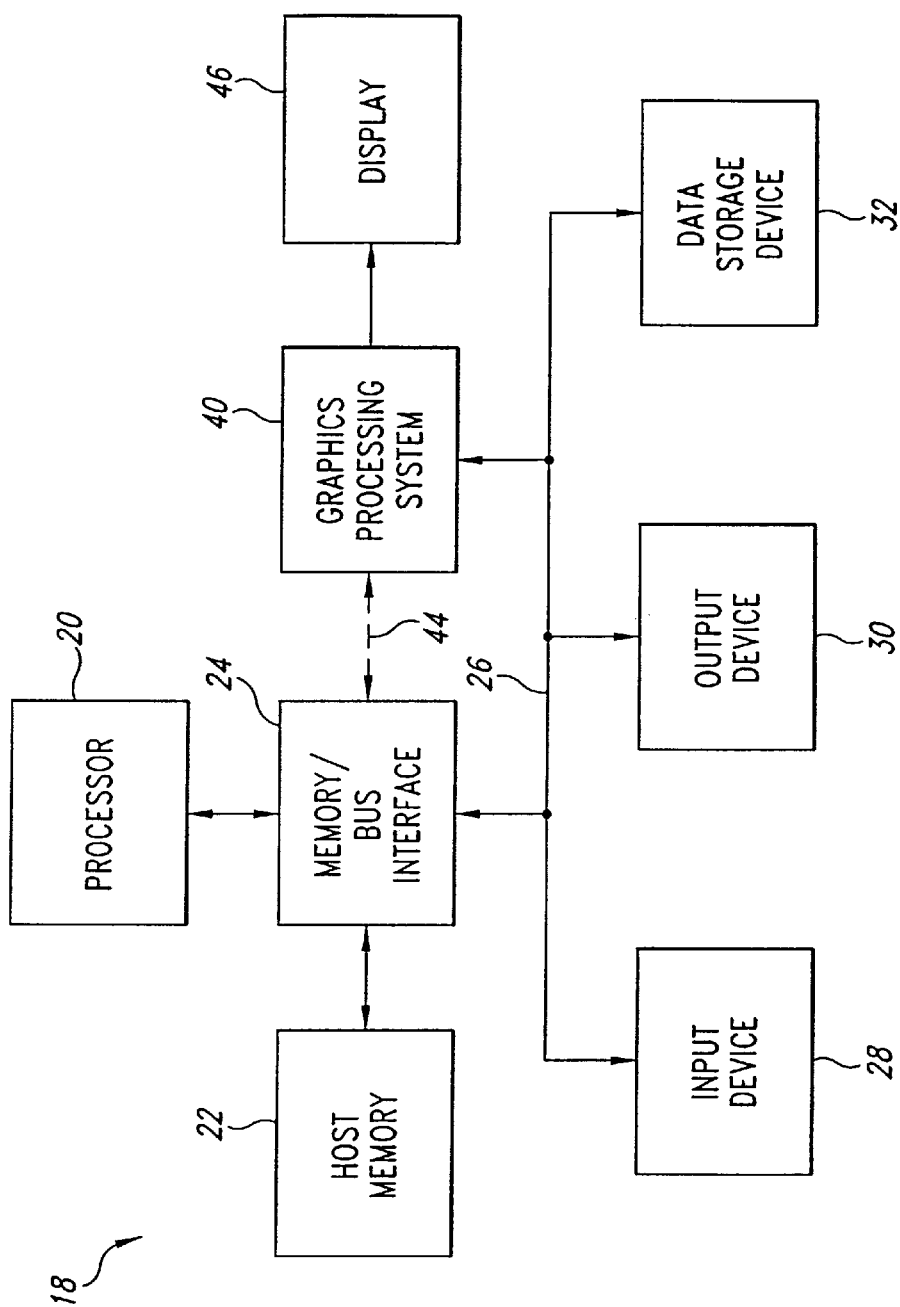
FIG. 3 is a block diagram of a computer system in which an embodiment of the present invention is implemented.

Embodiments of the present invention provide a method and apparatus for compressing graphics data, such as texture data, into a data format that facilitates efficient memory address generation. FIG. 3 illustrates a computer system 18 in which embodiments of the present invention are implemented. The computer system 18 includes a processor 20 coupled to a host memory 22 by a memory/bus interface 24. The memory/bus interface 24 is also coupled to an expansion bus 26, such as an industry standard architecture (ISA) bus or a peripheral component interconnect (PCI) bus. The computer system 18 also includes one or more input devices 28, such as a keypad or a mouse, coupled to the processor 20 through the expansion bus 26 and the memory/bus interface 24. The input devices 28 allow an operator or an electronic device to input data to the computer system 18. One or more output devices 30 are coupled to the processor 20 to provide output data generated by the processor 20. The output devices 30 are coupled to the processor 20 through the expansion bus 26 and memory/bus interface 24. Examples of output devices 30 include printers and a sound card driving audio speakers. One or more data storage devices 32 are coupled to the processor 20 through the memory/bus bridge interface 24, and the expansion bus 26 to store data in or retrieve data from storage media (not shown). Examples of storage devices 32 and storage media include fixed disk drives, floppy disk drives, tape cassettes and compact-disk read-only memory drives.

The computer system 18 further includes a graphics processing system 40 coupled to the processor 20 through the expansion bus 26 and memory/bus interface 24. Embodiments of the present invention are implemented within the graphics processing system 40. Optionally, the graphics processing system 40 may be coupled to the processor 20 and the host memory 22 through other architectures. For example, the graphics processing system 40 may be coupled through the memory/bus interface 24 and a high speed bus 44, such as an accelerated graphics port (AGP), to provide the graphics processing system 40 with direct memory access (DMA) to the host memory 22. That is, the high speed bus 44 and memory bus interface 24 allow the graphics processing system 40 to read and write host memory 22 without the intervention of the processor 20. Thus, data may be transferred to, and from, the host memory 22 at transfer rates much greater than over the expansion bus 26. A display 46 is coupled to the graphics processing system 40 to display graphics images, and may be any type, such as a cathode ray tube (CRT) for desktop, workstation or server application, or a field emission display (FED), liquid crystal display (LCD), or the like, which are commonly used for portable computer.

Figure 4:
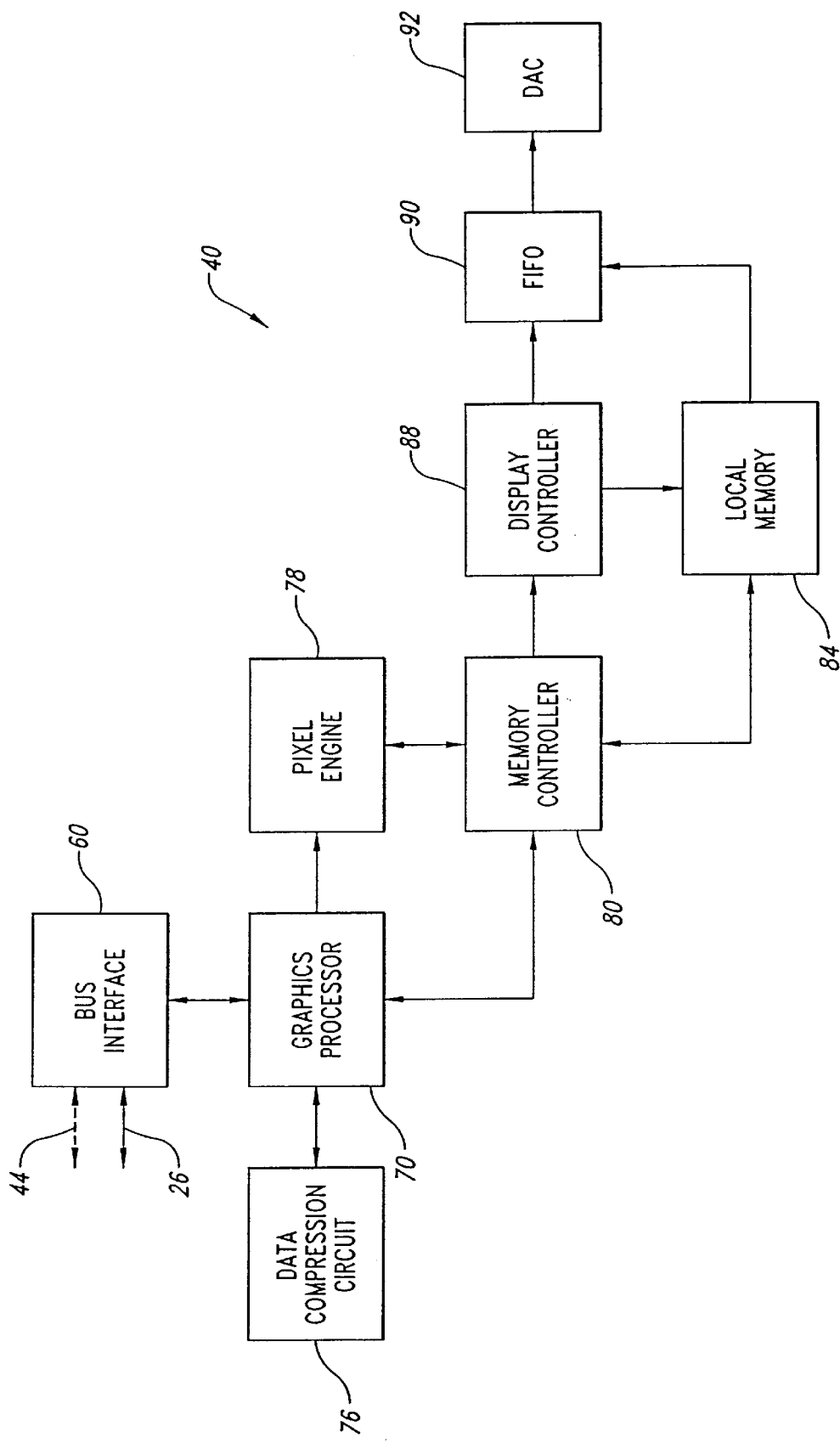
FIG. 4 is a block diagram of a graphics processing system in the computer system of FIG. 3.

FIG. 4 illustrates circuitry included within the graphics processing system 40, including circuitry for performing various three-dimensional (3D) graphics function. As shown in FIG. 4, a bus interface 60 couples the graphics processing system 40 to the expansion bus 26. Where the graphics processing system 40 is coupled to the processor 20 and the host memory 22 through the high speed data bus 44 and the memory/bus interface 24, the bus interface 60 will include a DMA controller (not shown) to coordinate transfer of data to and from the host memory 22 and the processor 20. A graphics processor 70 is coupled to the bus interface 60 and is designed to perform various graphics and video processing functions, such as, but not limited to, generating vertex data and performing vertex transformations for polygon graphics primitives that are used to model 3D objects. In a preferred embodiment, the graphics processor 70 is a reduced instruction set computing (RISC) processor. The graphics processor 70 further includes circuitry for performing various graphics functions, such as clipping, attribute transformations, rendering of graphics primitives, and generating texture coordinates from a texture map. A data compression circuit 76 compresses graphics data provided by the graphics processor 70 from the host memory 22 (FIG. 3). As will be explained in greater detail below, the data compression circuit 76 applies a compression method that compresses graphics data into a data format that facilitates efficient memory address generation.

A pixel engine 78 is coupled to receive the graphics data generated by the graphics processor 70. The pixel engine 78 contains circuitry for performing various graphics functions, such as, but not limited to, texture application or mapping, bilinear filtering, fog, blending, and color space conversion. Texture mapping refers to techniques for adding surface detail, or a texture map, to areas or surfaces of polygons rendered on the display 46. Stored in the host memory 18 of the computer system 10, a typical texture map includes point elements ("texels") which reside in a (s, t) texture coordinate space. The process of texture mapping occurs by accessing encoded surface detail points, or texels, and transferring the texture map texels to predetermined points of the polygons being texture mapped. The individual texels of the texture map data are applied within the respective polygon with the correct placement and perspective of their associated polygon. After texture mapping, a version of the texture image is visible on surfaces of the polygon with the proper perspective.

A memory controller 80 coupled to the pixel engine 78 and the graphics processor 70 handles memory requests to and from the host memory 22, and a local memory 84. The local memory 84 stores graphics data, such as texture data, in the compressed format provided by the data compression circuit 76 and the graphics processor 70, and additionally stores both source pixel color values and destination pixel color values. Destination color values are stored in a frame buffer (not shown) within the local memory 84. In a preferred embodiment, the local memory 84 is implemented using random access memory (RAM), such as dynamic random access memory (DRAM), or static random access memory (SRAM). A display controller 88 coupled to the local memory 84 and to a first-in first-out (FIFO) buffer 90 controls the transfer of destination color values stored in the frame buffer to the FIFO 90. Destination values stored in the FIFO 90 are provided to a digital-to-analog converter (DAC) 92, which outputs red, green, and blue analog color signals to the display 46 (FIG. 3).

In operation, a graphics application executing on the processor 20 writes graphics data, such as texture data, from the data storage device 32 to the host memory 22 in preparation for texture application by the pixel engine 78.

The texture data is stored in the data storage device 32 and written to the host memory 22 in a conventional 4:2:0 YCbCr format. When texture application begins, the pixel engine determines which blocks of texture data will be needed during texture application, and requests those blocks of texture data to be written to the local memory 84. The memory request is provided to the memory/bus interface 24, and the requested blocks of texture data are retrieved from the host memory 22 and provided to the graphics processor 70.

Prior to writing the retrieved blocks of texture data to the local memory 84, the texture data is compressed by the data compression circuit 76. The compression circuit 76 is illustrated in FIG. 4 as a separate circuit because it performs a separate function, however, it will be appreciated that the compression circuit 76 may be implemented by the graphics processor 70 executing a series of instructions stored in the local memory 84, or provided by the host processor 20.

As mentioned previously, the texture data retrieved from the host memory 22 is in a conventional 4:2:0 YCbCr format, and the blocks of texture data are segmented into 48-bit data structures 16 (FIG. 2) representing four pixels, or in the case of texture data, four texels. The compression circuit 76 compresses the 48-bit data structure 16 by reducing the number of bits representing the luma and chroma components for the four texels to less than 8-bits. In a preferred embodiment, the compression circuit 76 compresses the 48-bit data structure 16 into a 32-bit word.

Memory addresses for graphics data 32-bits in length and tiled in memory may be easily generated because the length of the graphics data is a power of two, namely $2^5$. Consequently, the memory address sequence, 0, 32, 64, . . . 32n, may be easily generated by incrementing the sixth least significant bit (LSB) of the binary address. In contrast, where the texture data is in a conventional 4:2:0 YCbCr format, and is represented by 48-bits, more of the lower order bits must be used to provide the appropriate memory address.

FIG. 5 illustrates an example of a 32-bit word 100 generated by the compression circuit 76. The luma components 110a–d of the four texels are reduced from 8-bits to 5-bits, and the chroma components, $Cb_{00}$ 112 and $Cr_{00}$ 114 are reduced from 8-bits to 6 bits. The resulting texture data word is 32-bits wide. There are many well-known techniques for reducing the number of bits representing each component to less than 8-bits. For example, one technique shifts a component to the right to remove the appropriate number of bits. Thus, to produce the 32-bit word 100 shown in FIG. 5, each of the 8-bit Y components would be right-shifted three bits, resulting in 5-bit Y components, and the 8-bit Cb and Cr components would be right-shifted two bits, resulting in two 6-bit chroma components. Additional hardware and computer implemented techniques for reducing the number of bits representing each component to less than 8-bits, and combining the resulting components, are well-known in the art, and will not be discussed in detail herein in the interests of brevity.

Reducing the number of bits representing the luma and chroma components to less than 8-bits reduces the gradations in the variation of the respective components, and consequently, decreases the color resolution of each component. However, an embodiment of the present invention includes dithering the compressed luma and chroma components to improve the visual quality of the image. A preferred dithering method uses the low two bits of the integer portion of the respective pixel's X and Y position as the dither matrix index, as specified by the following 4-by-4 dither matrix:

| y\x | 0  | 1  | 2  | 3  |
|-----|----|----|----|----|
| 0   | 0  | 12 | 3  | 15 |
| 1   | 7  | 11 | 4  | 8  |
| 2   | 13 | 1  | 14 | 2  |
| 3   | 10 | 6  | 9  | 5  |

The dither functions, written in "C" notation, are:

SixBitChroma=min (Chroma+(dither [X[1:0], Y[1:0]]>>>2), 255)>>2

FiveBitLuma=min (Luma+(dither [X[1:0], Y[1:0]]>>1), 255)>>3

That is, in dithering the 6-bit chroma values, the dither matrix values are shifted to the right 2-bits (i.e., the dither matrix value is divided by 4) and then added to the respective chroma value. The sum is then saturated to the range of 0 to 255, and the value is again right shifted by two bits. The remaining six bits are extracted and used for the respective chroma component. The previously described dithering method is provided by way of an example, and it will be appreciated that alternative dithering techniques, now known or later developed, may be applied and still remain within the scope of the present invention.

In addition to facilitating efficient address generation, an advantage provided by compressing graphics data from a conventional 4:2:0 YCbCr format into a 32-bit word reduces the pixel data stored by memory and processed by the graphics processing system. The resulting compression ratio of the 32-bit word 100 is 3:1 with respect to the conventional 24-bit format. It will be appreciated, that a compression ratio greater than that provided by a conventional 4:1:1 or 4:2:0 YCbCr format, namely 3:2, may also be obtained by packing the luma components of more than 4 pixels into a data structure greater than 32-bits. For example, if luma components of 8 pixels are combined with two shared chroma components and packed into 64-bits, the resulting compression ratio is again 3:1 with respect to the convention 24-bit format.

It will also be appreciated that data structures having lengths that are greater than 32-bits, but which are a power of two (e.g., $2^6$=64, $2^7$=128), will provide similar advantages as the 32-bit word 100. Although a detailed description of compressing graphics data to these lengths have been omitted from herein, packing and dithering luma and chroma components into data structures of these lengths by reducing the number of bits representing each component is well known in the art.

The luma and shared chroma components are arranged in the 32-bit word 100 to facilitate efficient processing of the texture data. As shown in FIG. 5, only 22 contiguous bits of the 32-bit word need to be read to determine the color value of a pixel. That is, the chroma components $Cb_{00}$ 112 and $Cr_{00}$ 114 are shared by the four pixels, thus, the first 22-bits consisting of the components $Y_{00}$ 110d and $Y_{10}$ 110c, and chroma components $Cb_{00}$ 112 and $Cr_{00}$ 114, are processed to determine the color of two pixels. The colors of the remaining two pixels are determined by reading the 22-bits consisting of the chroma components $Cb_{00}$ 112 and $Cr_{00}$ 114, and the components $Y_{01}$ 110b and $Y_{11}$ 110a.

Although the texture data has been described as being written to the host memory 22 in a conventional 4:2:0 YCbCr format, and subsequently compressed when written to the local memory 84, it will be appreciated that the texture data may be compressed when initially written to the host memory 22. That is, texture data provided by the data storage device 32 in a 4:2:0 YCbCr format is compressed when written to the host memory 22. As a result, the texture data requested by the pixel engine 78 is provided to the graphics processing system 40 already in a compressed format according to an embodiment of the invention as previously described. The compression circuit 76, in this case, is no longer included in the graphics processing system, but may be implemented by the host processor 20, or in a separate compression circuit (not shown) included in the computer system 18.

From the foregoing it will be appreciated that, although specific embodiments of the invention have been described herein for purposes of illustration, various modifications may be made without deviating from the spirit and scope of the invention. For example, embodiments of the present invention have been described with respect to a specific application to texture data. However, some, or all of the principles of the present invention may be applied to other graphics data representing color values in a color space. Accordingly, the invention is not limited except as by the appended claims.

What is claimed is:

1. A data structure representing graphics data stored in a memory of a computer system, comprising:
   first, second, third, and fourth luma fields five bits in length containing data representing luma components for first, second, third, and fourth pixels, respectively;
   first and second chroma fields six bits in length containing data representing first and second chroma components, respectively, that are shared by the luma fields, the first and second luma fields precede the first and second chroma fields, and the third and fourth luma fields follow the first and second chroma fields, the data structure is r bits in length, $r=2^s$ and s is an integer greater than or equal to five.

2. The data structure of claim 1 wherein s=5.

3. The data structure of claim 1 wherein the first chroma field comprises a blue chroma component (Cb), and the second chroma field comprises a red chroma component (Cr).

4. The data structure of claim 1 wherein the first, second, third, and fourth pixels are arranged in a two-by-two matrix.

5. The data structure of claim 4 wherein the first pixel is positioned at the upper left, the second pixel is positioned at the lower left, the third pixel is positioned at the upper right, and the fourth pixel is positioned at the lower right of the two-by-two matrix.

6. A graphics processing system, comprising:
   a processor; and
   a memory coupled to the processor to store graphics data having a data structure comprising:
      first, second, third, and fourth fields containing data representing a luma component for first, second, third, and fourth pixels, respectively; and
      fifth and sixth fields containing data representing first and second chroma components, respectively, shared by the first, second, third, and fourth luma components to determine a color value for each pixel, the first and second fields preceding the fifth and sixth fields, and the third and fourth fields following the fifth and sixth fields.

7. The graphics processing system of claim 6 wherein the graphics data comprises texture data.

8. The graphics processing system of claim 6 wherein the graphics data is represented by 32 bits.

9. The graphics processing system of claim 6 wherein the first chroma component comprises a blue chroma component (Cb), and the second chroma component comprises a red chroma component (Cr).

10. The graphics processing system of claim 6 wherein the first, second, third, and fourth pixels are arranged in a two-by-two matrix.

11. The graphics processing system of claim 10 wherein the first pixel is positioned at the upper left, the second pixel is positioned at the lower left, the third pixel is positioned at the upper right, and the fourth pixel is positioned at the lower right of the two-by-two matrix.

12. The graphics processing system of claim 6 wherein each of the luma components comprises m bits, and each of the chroma components comprises n bits.

13. The graphics processing system of claim 12 wherein m=5 and n=6.

14. A computer system, comprising:
   a processor;
   a compression circuit coupled to the processor to compress graphics data representing pixels having color values defined by luma and chroma components, the compression circuit compressing the graphics data by:
      reducing the number of bits representing the luma and chroma components to less than eight bits;
      combining luma components of four pixels with first and second shared chroma components; and
      dithering the luma and chroma components by adding a bit shifted value provided by a dithering matrix to a respective component to produce a sum, and saturating the sum to the range of 0 to 255;
   a memory coupled to the compression circuit to store the compressed graphics data; and
   a graphics processing system coupled to the memory to process the compressed graphics data.

15. The computer system of claim 14 wherein reducing the number of bits comprises shifting the bits to the right representing the respective component.

16. The computer system of claim 15 wherein shifting to the right comprising shifting the luma components 3 bits to the right to form 5 bit luma components and shifting the first and second shared chroma components 2 bits to the right to form 6 bit chroma components.

17. The computer system of claim 14 wherein combining comprises arranging the components into a data structure having the first and second shared chroma components interposed between the luma components of the four pixels.

18. A method of compressing graphics data representing color values of pixels, each pixel having a luma component and sharing chroma components with at least one other pixel, the method comprising:
   shifting the luma components 3 bits to the right to form 5 bit luma components and shifting the first and second shared chroma components 2 bits to the right to form 6 bit chroma components; and
   combining first, second, third, and fourth luma components of first, second, third, and fourth pixels, respectively, with first and second chroma components into a data structure r bits in length and having respective luma and chroma fields in which the respective luma and chroma components are contained, $r=2^s$ and s is an integer greater than or equal to five, the first and second luma fields precede the first and second chroma field, and the third and fourth luma fields follow the first and second chroma components.

19. The method of claim 18, further comprising dithering the luma and chroma components.

20. The method of claim 19 wherein dithering the luma and chroma components comprises:
adding a bit shifted value provided by a dithering matrix to a respective component to produce a sum; and
saturating the sum to the range of 0 to 255.

21. The method of claim 20 wherein the dithering matrix comprises:

| y\x | 0  | 1  | 2  | 3  |
|-----|----|----|----|----|
| 0   | 0  | 12 | 3  | 15 |
| 1   | 7  | 11 | 4  | 8  |
| 2   | 13 | 1  | 14 | 2  |
| 3   | 10 | 6  | 9  | 5  | the x- and y-coordinates of the dithering matrix corresponding to the two low bits of the x- and y-coordinates the respective pixel.

22. The method of claim 18 wherein s=5.

23. The method of claim 18 wherein the luma fields are m bits in length and the chroma fields are n bits in length, n being greater than m.

24. The method of claim 23 wherein m=5 and n=6.

25. The method of claim 18 wherein the first chroma field comprises a blue chroma component (Cb), and the second chroma field comprises a red chroma component (Cr).

26. The method of claim 18 wherein the first, second, third, and fourth pixels are arranged in a two-by-two matrix.

27. The method of claim 26 wherein the first pixel is positioned at the upper left, the second pixel is positioned at the lower left, the third pixel is positioned at the upper right, and the fourth pixel is positioned at the lower right of the two-by-two matrix.

28. A method of compressing graphics data representing pixels having respective color values defined by luma and chroma components, the method comprising:
shifting the luma components 3 bits to the right to form 5 bit luma components and shifting the first and second shared chroma components 2 bits to the right to form 6 bit chroma components; and
combining luma components of four pixels with first and second shared chroma components to form a data structure r bits in length, $r=2^s$ and s is an integer greater than or equal to five.

29. The method of claim 28, further comprising dithering the luma and chroma components.

30. The method of claim 29 wherein dithering the luma and chroma components comprises:
adding a bit shifted value provided by a dithering matrix to a respective component to produce a sum; and
saturating the sum to the range of 0 to 255.

31. The method of claim 30 wherein the dithering matrix comprises:

| y\x | 0  | 1  | 2  | 3  |
|-----|----|----|----|----|
| 0   | 0  | 12 | 3  | 15 |
| 1   | 7  | 11 | 4  | 8  |
| 2   | 13 | 1  | 14 | 2  |
| 3   | 10 | 6  | 9  | 5  | the x- and y-coordinates of the dithering matrix corresponding to the two low bits of the x- and y-coordinates of the respective pixel.

32. The method of claim 28 wherein combining comprises arranging the components into a data structure having the first and second shared chroma components interposed between the luma components of the four pixels.

33. A method of compressing graphics data representing color values of pixels, each pixel having a luma component and sharing chroma components with at least one other pixel, the method comprising:
reducing the number of bits representing the luma and chroma components; and
combining luma components of first, second, third, and fourth pixels with first and second chroma components into a data structure r bits in length and having luma fields five bits in length and chroma fields six bits in length, $r=2^s$ and s is an integer greater than or equal to five, the luma components for the first and second pixels preceding the first and second chroma components, and the luma components for the third and fourth pixels following the first and second chroma fields.

34. The method of claim 33, further comprising dithering the luma and chroma components.

35. The method of claim 34 wherein dithering the luma and chroma components comprises:
adding a bit shifted value provided by a dithering matrix to a respective component to produce a sum; and
saturating the sum to the range of 0 to 255.

36. The method of claim 35 wherein the dithering matrix comprises:

| y\x | 0  | 1  | 2  | 3  |
|-----|----|----|----|----|
| 0   | 0  | 12 | 3  | 15 |
| 1   | 7  | 11 | 4  | 8  |
| 2   | 13 | 1  | 14 | 2  |
| 3   | 10 | 6  | 9  | 5  | the x- and y-coordinates of the dithering matrix corresponding to the two low bits of the x- and y-coordinates of the respective pixel.

37. The method of claim 33 wherein reducing the number of bits comprises shifting the bits to the right representing the respective component.

38. The method of claim 37 wherein shifting to the right comprises shifting the luma components 3 bits to the right to form 5 bit luma components and shifting the first and second shared chroma components 2 bits to the right to form 6 bit chroma components.

39. The method of claim 33 wherein s=5.

40. The method of claim 33 wherein the first chroma field comprises a blue chroma component (Cb), and the second chroma field comprises a red chroma component (Cr).

41. The method of claim 33 wherein the first, second, third, and fourth pixels are arranged in a two-by-two matrix.

42. The method of claim 41 wherein the first pixel is positioned at the upper left, the second pixel is positioned at the lower left, the third pixel is positioned at the upper right, and the fourth pixel is positioned at the lower right of the two-by-two matrix.

* * * * *

UNITED STATES PATENT AND TRADEMARK OFFICE
CERTIFICATE OF CORRECTION

PATENT NO. : 6,747,661 B1
DATED : June 8, 2004
INVENTOR(S) : James R. Peterson

It is certified that error appears in the above-identified patent and that said Letters Patent is hereby corrected as shown below:

Column 1,
Line 51, "increased, Methods for" should read -- increased, methods for --.
Line 63, "its own Y components." should read -- its own Y component. --.

Column 2,
Line 45, "address generations" should read -- address generation. --.
Line 64, "are preceded, and followed" should read -- are preceded and followed --.

Column 3,
Line 29, "operator or an" should read -- operator of an --.
Line 63, "or server application," should read -- or server applications, --.
Line 65, "portable computer." should read -- portable computers. --.

Column 5,
Line 15, "function, however, it" should read -- function; however, it --.

Column 6,
Line 14, "SixBitChroma=min (Chroma+(dither [X[1:0], Y[1:0]]>>>2, 255)>>2" should read -- SixBitChroma=min (Chroma+(dither [X[1:0], Y[1:0]]>>2, 255)>>2 --.
Line 35, "appreciated, that" should read -- appreciated that --.
Line 42, "to the convention" should read -- to the conventional --.

Column 8,
Line 41, "right comprising" should read -- right comprises --.

Signed and Sealed this

Thirtieth Day of May, 2006

JON W. DUDAS
*Director of the United States Patent and Trademark Office*